United States Patent [19]

Durland

[11] Patent Number: 5,345,341
[45] Date of Patent: Sep. 6, 1994

[54] METHOD OF MANUFACTURING A REPLICATED MAGNETIC REPRODUCING MEDIUM, SUCH AS A MAGNETIC-TAPE CASSETTE PROVIDED WITH A MUSIC RECORDING, AND MAGNETIC REPLICATION HEAD AND REPLICATION ARRANGEMENT FOR USE IN THE METHOD

[75] Inventor: Jozef M. Durland, Leusden, Netherlands

[73] Assignee: U.S. Philips Corporation, New York, N.Y.

[21] Appl. No.: 146,467

[22] Filed: Nov. 1, 1993

Related U.S. Application Data

[63] Continuation of Ser. No. 929,067, Aug. 12, 1992, abandoned.

[30] Foreign Application Priority Data

Mar. 19, 1992 [EP] European Pat. Off. ........ 92200799.2

[51] Int. Cl.$^5$ .................... G11B 5/86; G11B 5/265; G11B 5/29
[52] U.S. Cl. ........................................ 360/15; 360/121
[58] Field of Search ................. 360/15, 121, 122, 110, 360/119, 62-64

[56] References Cited

FOREIGN PATENT DOCUMENTS 0381266 8/1990 European Pat. Off.
0038923 3/1984 Japan ..................................... 360/15

OTHER PUBLICATIONS

*Magnetic Recording*, Charles Lowman, ©1972, McGraw-Hill Inc., p. 34.
*Television Engineering Handbook*, K. Blair Benson, 1986, pp. 15.27–15.50.
*Videotape Recording–Theory and Practice*, Joseph F. Robinson, 1978, p. 26.
*Advanced Audio Technologies Stimulate Concepts for Future Use*, JEI Jul., 1993, pp. 32–40.

*Primary Examiner*—Aristotelis Psitos
*Assistant Examiner*—Jennifer Pearson
*Attorney, Agent, or Firm*—Edward W. Goodman

[57] ABSTRACT

A method of manufacturing a replicated magnetic reproduction medium, such as a magnetic-tape cassette provided with a music recording, which reproduction medium includes a magnetic tape having a plurality of tracks extending parallel to one another in the longitudinal direction at specified spacings within certain limits from one another. The reproduction medium thus manufactured serves for the reproduction of the replicated signals by a magnetic reproducing head having a plurality of transducing gaps situated at specified spacings within certain limits from one another. During reproduction, a specified normal tape tension within certain limits is sustained, resulting in a normal surface pressure between the tape and the head face of the reproducing head.

During replication the tape is moved over a head face of a magnetic replication head also having a plurality of transducing gaps with a certain spacing from one another.

The the tension in the tape is increased relative to the normal tension. Another characteristic feature is that, in order to compensate, at least partly for deviations in the positions of the tracks which would arise as a result of the increased transverse contraction of the tape caused by the increased tension, the spacings between the centers of the transducing gaps of the replication head are smaller than those of the reproducing head.

6 Claims, 2 Drawing Sheets

METHOD OF MANUFACTURING A REPLICATED MAGNETIC REPRODUCING MEDIUM, SUCH AS A MAGNETIC-TAPE CASSETTE PROVIDED WITH A MUSIC RECORDING, AND MAGNETIC REPLICATION HEAD AND REPLICATION ARRANGEMENT FOR USE IN THE METHOD

This is a continuation of application Ser. No. 07/929,067, filed on Aug. 12, 1992 now abandoned.

BACKGROUND OF THE INVENTION

1. Field of the Invention

The invention relates to a method of manufacturing a replicated magnetic reproduction medium, such as a magnetic-tape cassette provided with a music recording, which reproduction medium comprises a magnetic tape having a plurality of tracks extending parallel to one another in the longitudinal direction at specified spacings within certain limits from one another, which reproduction medium serves for the reproduction of the replicated signals by means of a magnetic reproducing head having a plurality of transducing gaps situated at specified spacings within certain limits from one another with a specified normal tape tension within certain limits, which method comprises the transport of the tape during the replication over a head face of a magnetic replication head also having a plurality of transducing gaps with a certain spacing from one another.

2. Description of the Related Art

It is known (see Philips Technical Review, Vol. 31, 1970, No. 3, herewith incorporated by reference) to provide Compact Cassettes with a music recording in the manner described. The replicated media are generally referred to as Music Cassettes. During replication a magnetic tape having a width of 3.81 mm is moved past a replication head with a speed which is 32 or even 64 times the normal reproduction speed. Four juxtaposed parallel tracks are recorded on the tape simultaneously, i.e. two tracks in the A-sector to be played in the forward direction and, at the same time, two tracks in the B-sector of the tape, to be played in the reverse direction. In accordance with the standard for the Compact Cassette System (see Publication 94-7 of the Bureau Central de la Commission Electrotechnique Internationale, 3 Rue de Varembé, Geneva, Switzerland, herewith incorporated by reference) the width of each track is 0.62 mm. The spacing between two tracks in the same sector is 0.3 mm. The spacing from the adjacent tracks in the A-sector or the B-sector is 0.66 mm.

The use of a transport speed for replication which is substantially higher than the normal reproduction speed is of great importance in order to realize a method which can be carried out on industrial scale at reasonable cost.

The Compact Cassette system is a so-called analog recording/reproducing system, i.e. the signals recorded on the tape are of an analog nature. Since some time, a new digital recording/reproducing system related to the Compact Cassette system has attracted much attention: the so-called Digital Compact Cassette system or DCC. In view of this, the well-known analog Compact Cassette system is now often referred to by the abbreviation ACC: Analog Compact Cassette system.

In the same way as in the well-known ACC system, the tape in the DCC system also has an A-sector to be played in the forward direction and a B-sector to be played in the reverse direction. However, each sector now comprises nine parallel tracks, i.e. eight parallel digital audio tracks and one digital auxiliary track. This means that there are nine tracks in each sector and eighteen tracks in total. The magnetic tape being used has a width substantially equal to that of ACC, i.e. 3.78 mm. Consequently, the width of the tracks and the intertrack spacing in the DCC system is substantially smaller than in the ACC system.

The width of the tracks specified for DCC for replicated music recordings is 0.185 mm. The specified distance from one edge of a track to a corresponding edge of an adjacent track in the same sector is 0.195 mm. When such narrow tracks and such small intertrack spacings are used a very good guidance of the magnetic tape over the magnetic head during reproduction is essential in order to achieve that the transducing gaps of the magnetic head are situated exactly at the location of the tracks on the tape. In the DCC system one edge of the tape is therefore held in contact with a tape guide during playing, see the Applicant's earlier European Patent Application 91203255.4 ([PHN 13907], herewith incorporated by reference). Although the tolerances on the track width and the intertrack spacing in the DCC system are very small, yet due to the large number of tracks the resulting total tolerance range with respect to the position of the track which is remotest from the tape guide will be substantial in comparison. Therefore it is possible only with difficulty to ensure that during reproduction the track which is remotest from the tape guide can actually be read by the transducing gap of the reproducing head. Variables of different nature will influence the positions of the tracks relative to the associated transducing gaps of the magnetic head. These variables include, for example, temperature, undulation of the edge of the magnetic tape, differences between the tape guides of the replication arrangement and the reproducing apparatus, similar differences in the positions of the transducing gaps of the magnetic heads of the replication arrangement and the reproducing apparatus, tape-width tolerances, etc. In addition, there are differences in tape stretch and hence in transverse contraction of the tape during replication and playing of the tape. It is important that also during replication the position of the tape in relation to the head gaps of the replication head is accurately adjusted and the adjusted position is subsequently maintained.

In order to guarantee proper contact between a magnetic tape and a magnetic head and hence a correct signal transfer the tape must be pressed against the head face of the magnetic head with a specific force. Therefore, a certain tension is maintained in the tape during reproduction, while in addition, the tape is pressed against the head face by a pressure felt. In replication arrangements, the use of a pressure felt is undesirable, inter alia in view of the high speed of transport of the tape.

SUMMARY OF THE INVENTION

It is an object of the invention to provide a magnetic-media replication method of the kind defined in the opening paragraph, which enables a satisfactory signal transfer at a high transport speed to be obtained and which also has a favorable influence on the magnitude of resulting deviations in the positions of the tracks on the tape.

To this end the method in accordance with the invention is characterized in that during the replication, the tension in the tape is increased in comparison with the normal tension, and the spacings between the centers of the transducing gaps of the replication head are smaller than those of the reproducing head.

The advantage of the invention is that the existence of an increased tension in the tape enables a satisfactory contact between tape and head face and hence a satisfactory signal transfer to be obtained even at high transport speeds, the adverse effect of the resulting larger transverse contraction of the tape on the positions of the tracks being counteracted by a correction of the position of the transducing gaps of the replication head.

An advantageous embodiment of the invention is characterized in that during the replication a specified increased tension within certain limits is used, and the spacings between the transducing gaps of the replication head are situated within certain limits such that the spacings between the centers of the tracks on the tape at the normal tension are equal to said specified spacings within certain limits between the centers of the transducing gaps of the reproducing head. This embodiment aims at optimum effect of the inventive principle at the expense of a slight increase in complexity of the replication arrangement. Indeed, this arrangement should be provided with the necessary control equipment to maintain the desired tape tension constant within specific limits. Moreover, a special replication head is required having transducing gaps spaced at accurately specified smaller distances from one another.

Experience shows that it is advantageous to have an embodiment of the invention which is characterized in that the increased tension has such a value that the contraction occurring in the transverse direction of the tape is approximately 0.3%, and the spacings between the centers of the transducing gaps of the replication head axe approximately 0.3% smaller than those of the reproducing head. With these values, a satisfactory replication quality is obtained without the tension in the tape being higher than necessary. A higher tension results in unnecessary deformations of the tape and additional wear of the replication head and other parts of the replication arrangement.

The invention also relates to a magnetic replication head and a replication arrangement for use with a method in accordance with the invention.

BRIEF DESCRIPTION OF THE DRAWING

The invention will now be described in more detail, merely by way of illustration, with reference to the drawing which relates to a possible embodiment to which the invention is not limited and in which.

DESCRIPTION OF THE PREFERRED EMBODIMENT

Figure 1:
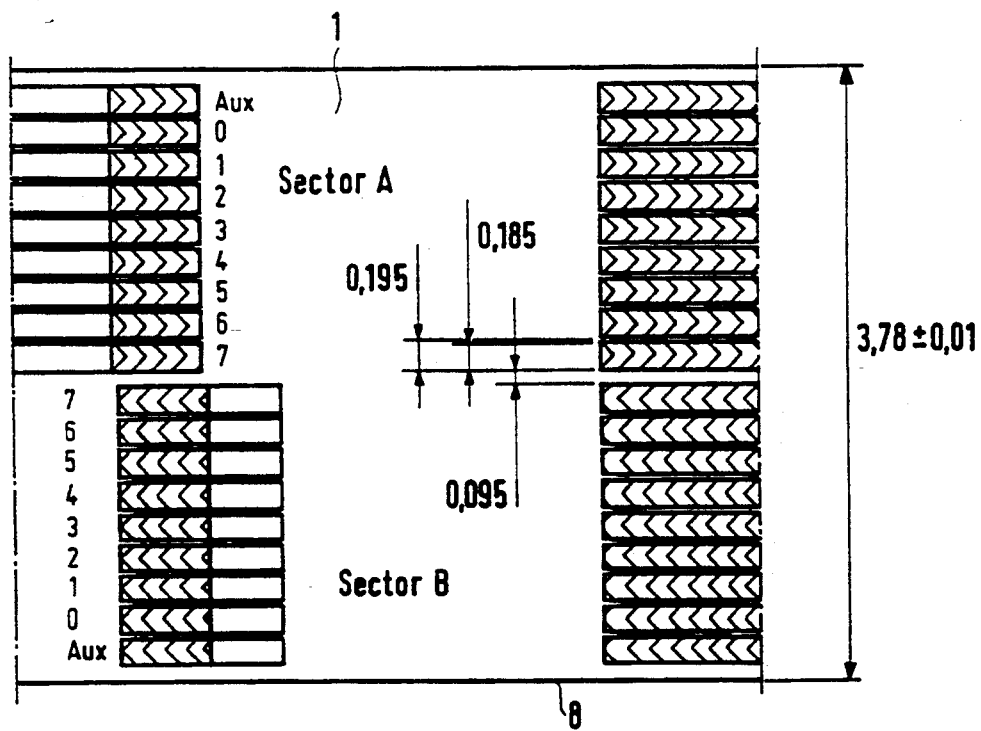
FIG. 1 is a view showing the active side of a piece of magnetic tape to a highly enlarged scale, symbolically showing the numbers, position and dimensions of a plurality of tracks in two sectors.

As is shown in FIG. 1 the magnetic tape 1, as is specified for the DCC system, has a width of 3.78 mm with tolerance of 0.01 mm, positive as well as negative. In the longitudinal direction the tape has been divided into two sectors, a sector A and a sector B. Nine tracks are situated in each sector after replication. The tracks 0 to 7 contain digital music information and the track referenced "Aux" serves, for additional information. As is shown in FIG. 1 the width of a track is 0.185 mm. This means that the width of the track may lie between 0.1845 mm and 0.1854 mm and the tolerance range is consequently 0.0009 mm.

FIG. 1 also indicates the spacing between corresponding edges of the tracks situated in the same sector (0.195 mm) specified for the DCC system and the spacing between the track "7" in the sector A and the track "7" in the sector B (0.095 mm). Obviously, it is also possible to calculate the tolerance ranges for these spacings in a manner as described above.

Figure 2:
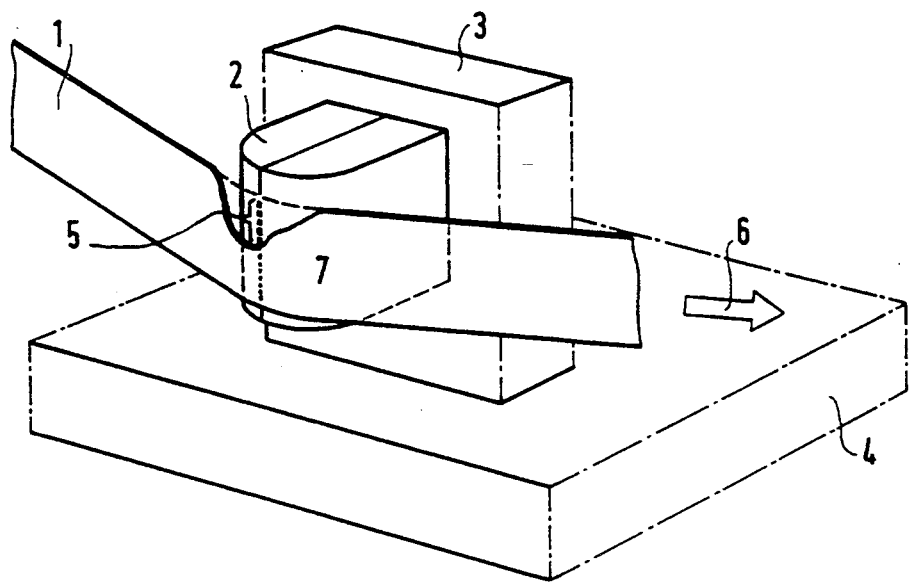
FIG. 2 is a diagrammatic perspective view of a part of a replication arrangement with a replication head and a tape moving over this head.

As is shown diagrammatically in FIG. 2, the tape is moved over the head face 7 of a magnetic replication head 2 during the replication. The replication head is arranged on a base 3 of a replication arrangement 4. The replication head has a plurality of transducing gaps 5 which are spaced from each other in relation to the position of the tracks shown in FIG. 1. The replication head 2 may comprise, for example, nine transducing gaps corresponding to the nine tracks in a sector of the tape. The other nine tracks can then be recorded, for example, by means of s second replication head, not shown. Other replication-head configurations and other positions of transducing gaps are possible. For example, all the transducing heads required may be situated in a single replication head or a plurality of replication heads may be used for recording tracks with a spacing of one track in such a way that the tracks recorded by one replication head are situated between the tracks recorded by the other replication head, etc.

During replication, the tape 1 is moved over the head face 7 of the replication head 2 in the direction indicated by the arrow 6. Means, which are not shown but which are known per se, maintain a tension in the tape which is higher than the normal tension during reproduction of the recorded signals in a DCC recording/reproducing apparatus. Thus, in spite of the considerably higher speed of transport, it is yet possible to guarantee a satisfactory contact between the tape 1 and the head face 7. However, the higher tension also results in an increased tape stretch in comparison with the stretch occurring during normal reproduction. This also gives rise to an increased transverse contraction in the tape. If the spacings between the tracks in the situation illustrated in FIG. 2 would be the same as that in FIG. 1, the tracks would be spaced further apart after replication. This might in particular lead to excessive deviations in the spacing from the lower edge 8 of the tape to the tracks in the sector A which are remotest therefrom. As already stated, the edge 8 is held in contact with a tape guide in a DCC recording/reproducing apparatus. The tolerance range for the position of the tracks remotest from the tape guide is largest because the relevant tolerance range for each track is the sum of all the individual intermediate tolerance fields.

The method in accordance with the invention allows for this adverse effect of an increased tension in the tape. This is achieved in that the transducing gaps of the replication head 2 are spaced more closely than the corresponding transducing gaps of a recording/reproducing head of a DCC apparatus.

Preferably, an increased tension within specified limits is used during replication and the spacings between the transducing gaps of the replication head 2 are situated within certain limits such that the intertrack spacings on the tape during normal reproduction are equal to said spacings within specified limits between the transducing head of a DCC apparatus. Preferably, the increased tension used in practice has such a value that the contraction occurring in the transverse direction of the tape is approximately 0.3% smaller than that between the transducing gaps of the reproducing head.

Figure 3A:
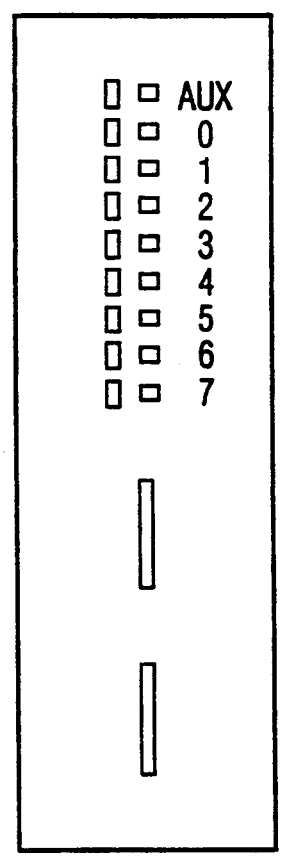
FIG. 3A shows a typical record/playback head for the DCC system, and FIG. 3B show a replication head for high speed replication of DCC digital cassettes.
Figure 3B:
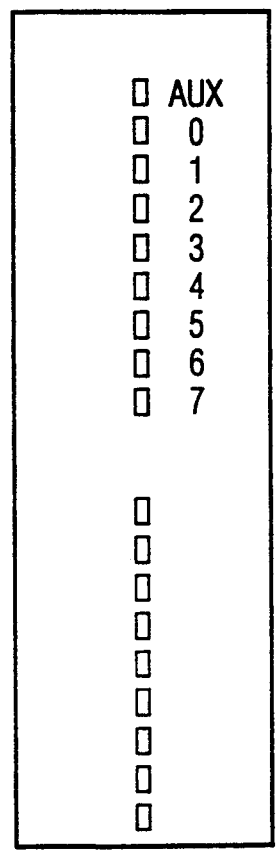

FIG. 3A shows a typical record/playback head for the DCC system. The head includes 9 digital recording gaps which form tracks on a tape having a spacing between centers of 0.195 mm. and a track width of 0.185 mm., as shown in FIG. 1. Situated next to the recording gaps are playback gaps. FIG. 3B shows the replication head of the subject invention. The replication head includes two sets of recording gaps for simultaneously recording both the A and B sides of a magnetic tape. As noted above, the spacing between centers of the gaps of the replication head are approximately 0.3% smaller than that of the record/playback head.

Although an embodiment of the method in accordance with the invention has been described with reference to the drawing, it is to be noted that the invention is by no means limited to the embodiment described herein. The invention also extends to all deviating embodiments within the scope defined by the claims and utilizing the basic idea of the invention, which is that during replication an increased tension in the tape is used in combination with a compensating reduced spacing between the transducing gaps of the replication head.

Thus, by way of example, in deviation from the example described herein, it is possible to use the method for manufacturing other reproducing media than DCC cassettes, for example for manufacturing magnetic-tape cassettes for other systems than the DCC system, for example for the ACC system or for a system for the storage of computer data.

The invention may have other advantages than those mentioned, depending on the embodiment used and the field of use. Further advantages may also become apparent upon a comparison of the invention with prior art other than cited.

I claim:

1. A method of manufacturing a replicated magnetic reproduction medium, such as a magnetic-tape cassette provided with a music recording, said reproduction medium comprising a magnetic tape having a plurality of tracks extending parallel to one another in a longitudinal direction of the magnetic tape at specified spacings within certain limits from one another, said reproduction medium serving for the reproduction of the replicated signal by means of a magnetic reproducing head having a plurality of transducing gaps situated at specified spacings within certain limits from one another with a specified normal tape tension within certain limits, said method comprising the steps:

transporting the tape during the replication over a head face of a magnetic replication head also having a plurality of transducing gaps with a certain spacing from one another, characterized in that said method further comprises the steps:

increasing the tension exerted on the tape in comparison with the normal tension; and reducing the spacings between the centers of the transducing gaps of the replication head to be smaller than those of a reproducing head.

2. A method as claimed in claim 1, characterized in that during the replication, said tension is increased within certain limits, and the spacings between the transducing gaps of the replication head are reduced within certain limits such that after replication, the spacings between the centers of the tracks on the tape at the normal tension are equal to said specified spacings within certain limits between the centers of the transducing gaps of a reproducing head.

3. A method as claimed in claim 2, characterized in that the increased tension has such a value that the contraction occurring in the transverse direction of the tape is approximately 0.3%, and the spacings between the transducing gaps of the replication head are approximately 0.3% smaller than those between the transducing gaps of the reproducing head.

4. A magnetic replication head for use in manufacturing a replicated magnetic reproduction medium, such as a magnetic-tape cassette provided with a music recording, said reproduction medium comprising a magnetic tape having a plurality of tracks extending parallel to one another, and serving for the reproduction of the replicated signals by means of a magnetic reproducing head having a plurality of transducing gaps situated at specified spacings within certain limits from one another with a specified normal tape tension within certain limits, wherein said magnetic replication head comprises a head face having a plurality of transducing gaps with a certain spacing from one another, and wherein, during replication, said magnetic tape is transported over the head face of said magnetic replication head at a tension increased in comparison with the normal tape tension, characterized in that the spacings between the centers of the transducing gaps of the magnetic replication head are smaller than the spacings between the transducing gaps of said reproducing head.

5. A magnetic replication head as claimed in claim 4, characterized in that the spacings between the transducing gaps of the magnetic replication head are situated within certain limits whereby when said increased tension is within certain limits, the spacings between centers of the tracks on the replicated magnetic tape at the normal tension are equal to said specified spacings within certain limits between the centers of the transducing gaps of the magnetic reproducing head.

6. A magnetic replication head as claimed in claim 5, characterized in that the spacings between the transducing gaps of the replication head are approximately 0.3% smaller that the spacings between the transducing gaps of the reproducing head, the increased tension during replication causing a corresponding approximately 0.3% contraction of the magnetic tape in the transverse direction of the magnetic tape.

* * * * *